United States Patent
Karp

(10) Patent No.: US 12,357,918 B2
(45) Date of Patent: *Jul. 15, 2025

(54) CLASSIFICATION OF GAMING STYLES

(71) Applicant: SONY INTERACTIVE ENTERTAINMENT LLC, San Mateo, CA (US)

(72) Inventor: Sarah Karp, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,824

(22) Filed: Apr. 9, 2024

(65) Prior Publication Data
US 2024/0269569 A1 Aug. 15, 2024

Related U.S. Application Data

(63) Continuation of application No. 18/198,066, filed on May 16, 2023, now Pat. No. 11,951,401, which is a
(Continued)

(51) Int. Cl.
*A63F 13/79* (2014.01)
*A63F 13/34* (2014.01)
*A63F 13/533* (2014.01)

(52) U.S. Cl.
CPC .............. *A63F 13/79* (2014.09); *A63F 13/34* (2014.09); *A63F 13/533* (2014.09); *A63F 2300/308* (2013.01); *A63F 2300/5546* (2013.01)

(58) Field of Classification Search
None
See application file for complete search history.

(56) References Cited

U.S. PATENT DOCUMENTS

| 8,298,087 B1 | 10/2012 | Smith |
| 11,654,371 B2 | 5/2023 | Karp |

(Continued)

FOREIGN PATENT DOCUMENTS

| CN | 115671746 | 2/2023 |
| EP | 4 124 369 | 2/2023 |

(Continued)

OTHER PUBLICATIONS 202210867173.8, Sarah Karp, Classification of Gaming Styles, Jul. 22, 2022.

(Continued)

*Primary Examiner* — Jason T Yen
(74) *Attorney, Agent, or Firm* — Kilpatrick Townsend & Stockton LLP

(57) ABSTRACT

A system of classifying game styles may track a play of a user of one or more media content. The tracked play of the user of one or more media content may be analyzed to characterize the play of the user based on one or more categories of user gameplay style. A plurality of categories of user gameplay style may be selected to be displayed as a visual display of the user gameplay style. The visual display of the user gameplay style may be compared to one or more visual displays of characteristics of other media content. A recommendation for other media content that share similar characteristics to the user gameplay style may be generated.

20 Claims, 10 Drawing Sheets

Related U.S. Application Data continuation of application No. 17/390,636, filed on Jul. 30, 2021, now Pat. No. 11,654,371.

(56) References Cited

U.S. PATENT DOCUMENTS

| | | | |
|---|---|---|---|
| 11,951,401 B2 | 4/2024 | Karp | |
| 2013/0079078 A1 | 3/2013 | Jung et al. | |
| 2014/0213350 A1 | 7/2014 | Froy | |
| 2015/0365449 A1 | 12/2015 | Kurata | |
| 2016/0067612 A1* | 3/2016 | Ntoulas | A63F 13/33 |
| | | | 463/29 |
| 2017/0064014 A1 | 3/2017 | Nomura | |
| 2017/0372225 A1* | 12/2017 | Foresti | G06F 16/285 |
| 2018/0117474 A1 | 5/2018 | Kawahara | |
| 2020/0139253 A1* | 5/2020 | Vennam | H04L 67/535 |
| 2020/0192929 A1 | 6/2020 | Stephens et al. | |
| 2020/0306638 A1* | 10/2020 | Fear | A63F 13/56 |
| 2020/0306641 A1* | 10/2020 | Kolen | A63F 13/54 |
| 2022/0118364 A1* | 4/2022 | de Mesentier Silva | A63F 13/69 |
| 2023/0030842 A1 | 2/2023 | Karp | |
| 2023/0302365 A1 | 9/2023 | Karp | |

FOREIGN PATENT DOCUMENTS

| | | | |
|---|---|---|---|
| JP | 2009162818 A | 7/2009 | |
| JP | 2010002944 A | 1/2010 | |
| JP | 2018153655 A | 10/2018 | |
| JP | 2020046853 A | 3/2020 | |
| JP | 6799271 B1 | 11/2020 | |
| JP | 2023-020979 | 2/2023 | |

OTHER PUBLICATIONS 22181971.7, Sarah Karp, Classification of Gaming Styles.
2022-117065, Sarah Karp, Classification of Gaming Styles.
European Application No. 22181971.7 Extended European Search Report dated Jan. 2, 2023.
U.S. Appl. No. 17/390,636 Office Action mailed Sep. 8, 2022.

* cited by examiner

CLASSIFICATION OF GAMING STYLES

CROSS-REFERENCE TO RELATED APPLICATION

This application is a continuation and claims the priority benefit of U.S. patent application Ser. No. 8/198,066 filed May 16, 2023, now U.S. Pat. No. 11,951,401, which is a continuation and claims the priority benefit of U.S. patent application Ser. No. 17/390,636 filed Jul. 30, 2021, now U.S. Pat. No. 11,654,371, which are incorporated by reference herein in their entirety.

BACKGROUND OF THE INVENTION

1. Field of the Invention

The present invention generally relates to analyzing user gameplay data, history, and preferences. More specifically, the present system relates to identifying gameplay patterns within different game titles played by the user and making custom predictions as to other game titles.

2. Description of the Related Art

Acquiring and playing a new game title can represent a considerable investment of time, energy, and finances by the player. An individual may have limited budget and leisure time to dedicate to the games they choose to play. As such, many consumers often seek advice or other types of research data from friends, review websites, gameplay streams, pre-recorded video content, walk-throughs, and other sources of information in order to obtain information regarding a new game title before purchase of the same. Despite additional effort applied to determine whether a certain video game title may likely be compatible with their individual interests and preferences, the user may still find elements of the game undesirable and feel they have wasted time, energy, and resources.

Developers, publishers, digital distribution platforms, and hardcopy games may not provide enough information for a user to distinguish a worthwhile experience from a poor use of resources. Gameplay trailers, screenshots, and other media content from a developer or publisher may be unintentionally misleading or depict gameplay that the user is incapable of enacting due to such issues as accessibility, skill level/experience, time available to overcome the necessary gameplay obstacles, misrepresentation of the flow of gameplay, and many others. Digital distribution platforms used to purchase and download video games may typically contain only short textual descriptions of the content, some related imagery or video, and cursory reviews from other users with simplified star or point ratings, etc. Such high-level descriptions may offer no additional personalization as to the particular interests and characteristics of a potential player. The lack of integrated individualized information available forces the player into performing time-consuming research that may or may not yield any useful information.

There is therefore a need in the art for improved systems and methods of identifying gameplay patterns within different game titles played by the user and making customized predictions as to other game titles.

SUMMARY OF THE CLAIMED INVENTION

Embodiments of the present invention may include systems and methods for classifying gameplay styles. An embodiment of a system of classifying game styles may track a play of a user of one or more media content. The tracked play of the user of one or more media content may be analyzed to identify one or more patterns and characterize the play of the user based on one or more categories of user gameplay style. A plurality of categories of user gameplay style may be selected to be displayed as a visual display of the user gameplay style. The visual display of the user gameplay style may be compared to one or more visual displays of characteristics of other media content. Predictions or recommendations for other media content that share similar characteristics to the user gameplay style may be generated.

In another embodiment, methods for classification of gaming styles of a user may be provided. Such methods may include tracking gameplay records of a user, detecting a categorization or classification of a game style or gameplay preference, generating a visual graphical representation of the categorization or classification, comparing a gameplay categorization to other games, generating a visual graphical analysis of a selected games categorization, displaying a superimposed or overlaid representation of a selected games categorization on a historic categorized gameplay preference of a user, generating and displaying predictions and recommendations for games similar to categorized gameplay preference, and displaying potential social connections with other users in the network based on a categorized gameplay preference.

DETAILED DESCRIPTION

System and methods for classifying game styles are disclosed. The system may track gameplay of a user of one or more media content. The tracked gameplay of the user of one or more media content may be analyzed to identify gameplay patterns that correspond to one or more categories of gameplay style. A plurality of categories of user gameplay style may be selected to be displayed as a visual display of the user gameplay style. The visual display of the user gameplay style may be compared to one or more visual displays of characteristics of other media content. A recommendation for other media content that share similar characteristics to the user gameplay style may be generated.

Figure 1:
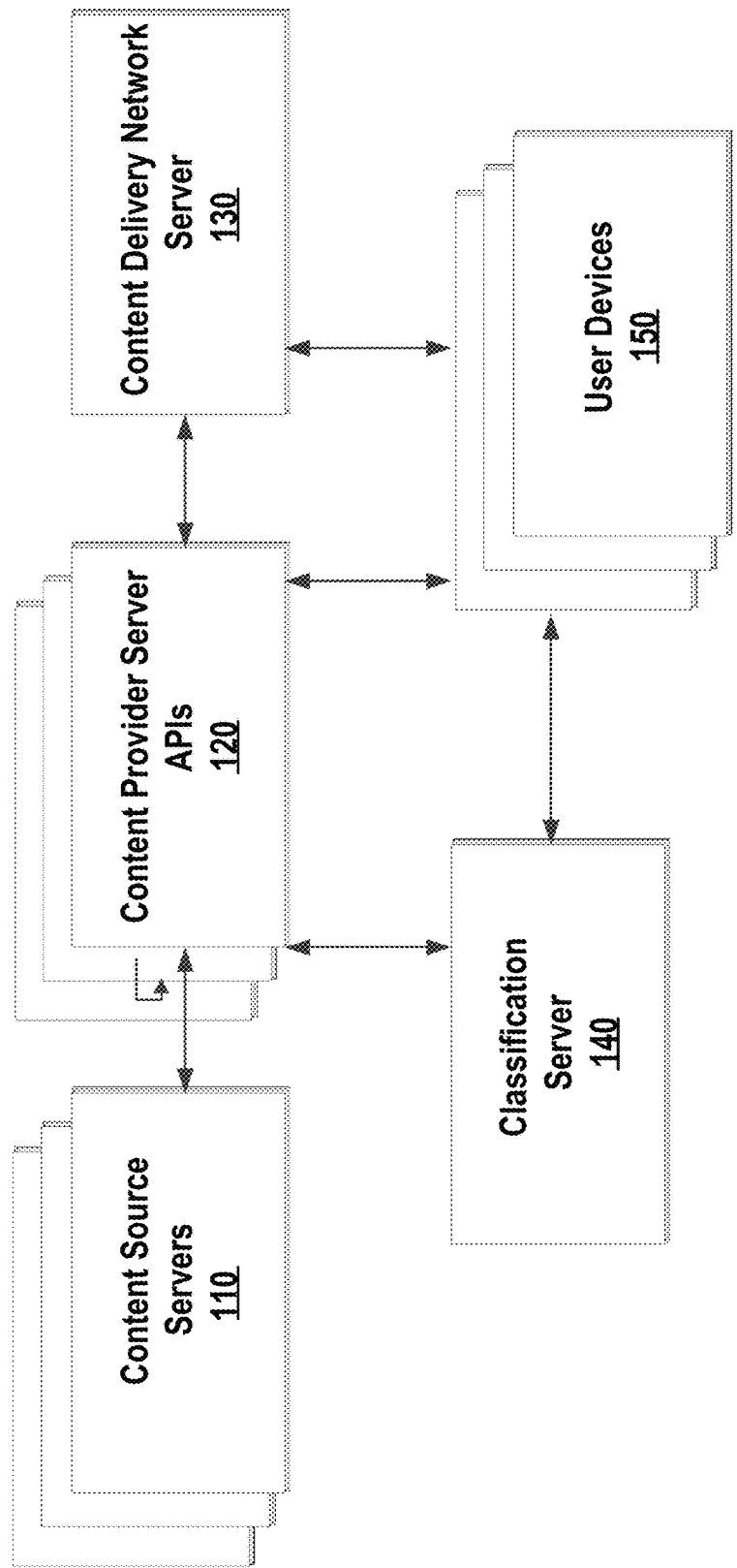
FIG. 1 illustrates an exemplary network environment in which a system for classification of gaming styles may be implemented.

FIG. 1 illustrates an exemplary network environment 100 in which a system for classification of gaming styles may be implemented. The network environment 100 may include one or more content source servers 100 that provide digital content (e.g., games, other applications and services) for distribution, one or more content provider server application program interfaces (APIs) 120, content delivery network server 130, a classification server 140, and one or more user devices 150. The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content available for distribution. The content source servers 110 may be associated with any content provider that makes its content available for access over a communication network. Such content may include not only digital video and games, but also other types of digital applications and services. Such applications and services may include any variety of different digital content and functionalities that may be provided to user devices 150.

The content from content source server 110 may be provided through a content provider server API 120, which allows various types of content sources server 110 to communicate with other servers in the network environment 100 (e.g., user devices 150). The content provider server API 120 may be specific to the particular language, operating system, protocols, etc. of the content source server 110 providing the content, as well as the user devices 150. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may use different operating systems, protocols, etc., to process such content. As such, applications and services in different formats may be made available so as to be compatible with a variety of different user device 150.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (i.e. metadata) can be usable to provide details about the content or service being provided to the user device 150. In some embodiments, the services provided from the content source servers 110 to the user device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

Classification server 140 may include any data server known in the art that is capable of classification of gaming styles. In an exemplary implementation, classification server 140 may obtain and store user profiles that include historic user data regarding a user of user device 150. Such historic user data may be related to media content with which a user has interacted in each historic gameplay session and may include such data as game titles played, total time played, time played per session, time played in single-player or multiplayer modes, teammates or competitors, time to complete each level (e.g., activity), activities attempted and completed, as well as title-specific and activity-specific data (e.g., number of character deaths or failure rate), percent completion of mandatory and voluntary objectives, behavioral preferences (e.g., melee combat, run and gun, exploration), difficulty settings selected, and other statistics dependent on the individual media content.

Further, classification server 140 may store data related to characteristics of media content. Characteristics of media content may include data inherent to the media content such as genre data (e.g., puzzle, third-person shooter, platformer, cinematic), available game modes (e.g., competitive, player-versus-environment), types of in-game activities, metrics for measuring in-game status and progress, and other characteristics dependent on the individual media content title.

In exemplary implementations of the present invention, classification server 140 may perform analyses of the historic user data to identify one or more gameplay patterns related to specific game titles or in-game activities in which the user participated. Such gameplay patterns may be translated into a data visualization display that illustrates how the identified gameplay patterns correspond to different gameplay categories. Such data visualizations (and displayed gameplay categories) may be specific to certain game titles, certain genres of game titles, certain timeframes, or any other combination of categories that correspond to the gameplay patterns.

Further, classification server 140 may generate overlays corresponding to different game titles and associated characteristics. When overlaid over the data visualization of the gameplay patterns associated with the user, certain game titles may be determined to include or not include characteristics that correspond to the gameplay patterns of the user. Thus, predictions may be made as to how likely the user would be interested in and enjoy playing a particular game title. Such data visualizations and overlays may be provided to the user (via user device 150), as well as shared with other individuals and entities (via corresponding user devices 150). In various embodiments, a custom notification may be generated that includes such data visualizations and overlays, as well as custom predictions or recommendations regarding specific game titles. Such custom notification (and custom predictions or recommendations) may include a summary of the identified gameplay patterns and an explanation of how the gameplay patterns correspond (and/or not correspond) to the game title.

The user device 150 may include a plurality of different types of computing devices. The user device 150 may be a server that provides an internal service (e.g., to other servers) in network environment 100. In such cases, user device 150 may correspond to one of the content servers 110 described herein. Alternatively, the user device 150 may be a client device that may include any number of different gaming consoles, mobile devices, laptops, and desktops. Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory), and processors for executing instructions that may be stored in memory. These user devices 150 may also run using a variety of different operating systems (e.g., IOS, Android), applications or computing languages (e.g., C++, JavaScript). Each user device 150 may be associated with participants or other types of spectators of a collection of digital content streams.

Figure 2:
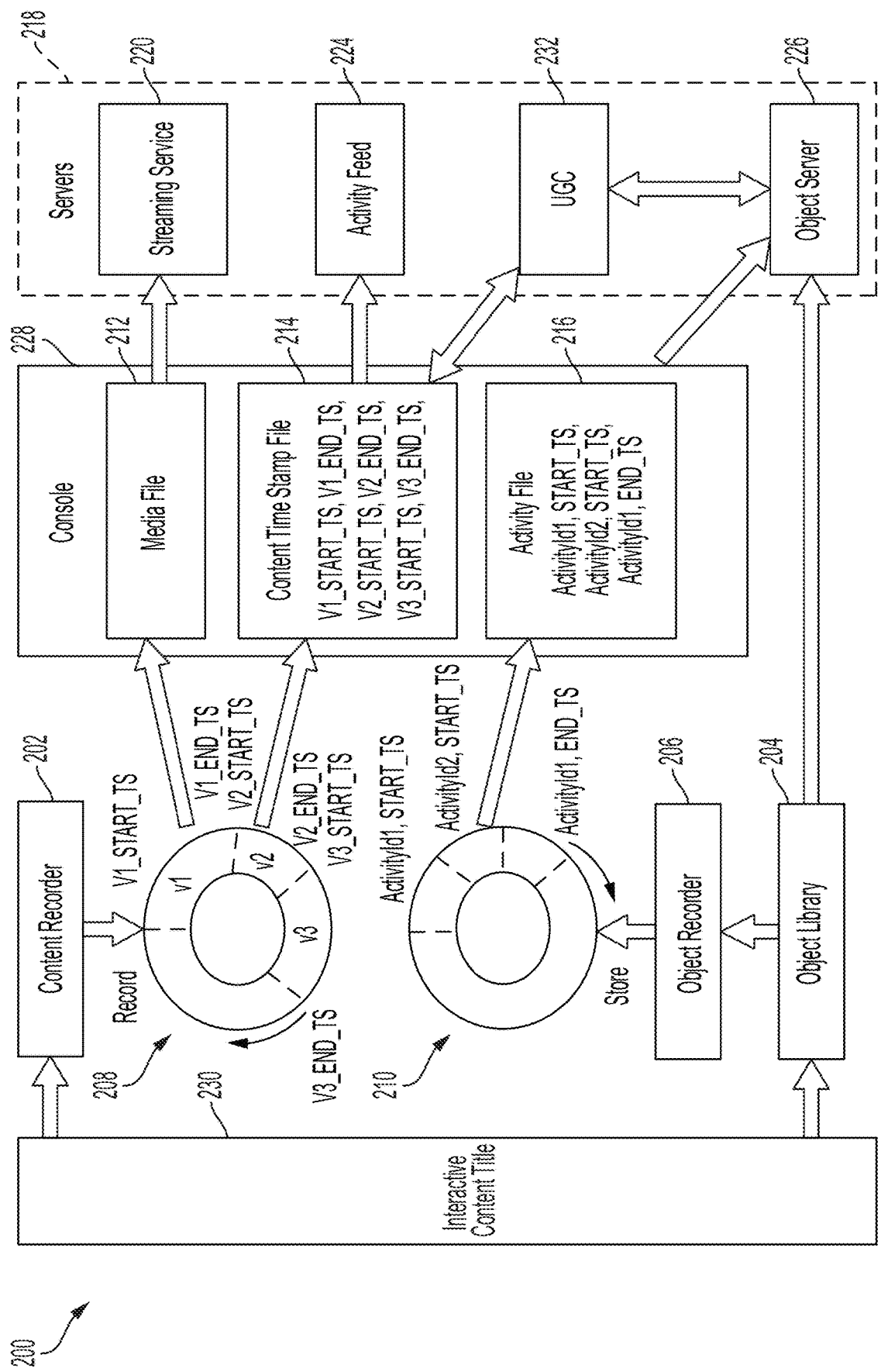
FIG. 2 illustrates an exemplary uniform data system (UDS) that may be used to provide data to a system for classification of gameplay styles.

FIG. 2 illustrates an exemplary uniform data system (UDS) 200 that may be used to provide data to a system for classification of gameplay styles. Based on data provided by UDS, classification of gaming styles server can be made aware of what in-game objects, entities, activities, and events that users have engaged with, and thus support analysis of and coordination with in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

As illustrated in FIG. 2, an exemplary console 228 and exemplary servers 218 (including streaming service 220, an activity feed server 224, a user-generated content (UGC) server 232, and an object server 226) are shown. In different embodiments, the console 228 may be implemented on the content source server 110, a cloud server, any of the servers 218, or user device 150. In an exemplary example, a content recorder 202 may be implemented on the content source server 110, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 150. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 150.

Concurrent to the content recorder 202 receiving and recording content from the interactive content title 230, an object library 204 receives data from the interactive content title 230, and an object recorder 206 tracks the data to determine when an object begins and ends. The object library 204 and the object recorder 206 may be implemented on the content source server 110, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 150.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 150. In another example, an object file 216 and a content time stamp file 214 may be associated by the console 228 during creation of each file 216, 214.

In exemplary embodiments of the present invention, the activity files 216 generated by UDS system 200 may be provided to classification server 140 as part of the historic gameplay data associated with a user. Such activity files 216 may be provided for each game session in which the user has engaged in gameplay. The classification server 140 may therefore be able to identify a specific gameplay activity within game title, as well as identify associated in-game parameters associated with the activity, including type of challenges or obstacles, type and amount of action taken by the user, how success or failure is measured, what virtual objects, environments, or characters were involved, and other parameters related to the specific game title or activity. Each of the parameters may be analyzed in conjunction with activity files from past gameplay sessions of the user to determine whether any gameplay patterns can be identified. Such gameplay patterns may also be compared to patterns associated with other users to identify similarities and differences therefrom. In such instances, the historic gameplay data of other users may also be used to identify the gameplay patterns of the user, as well as to generate predictions and recommendations.

Figure 3:
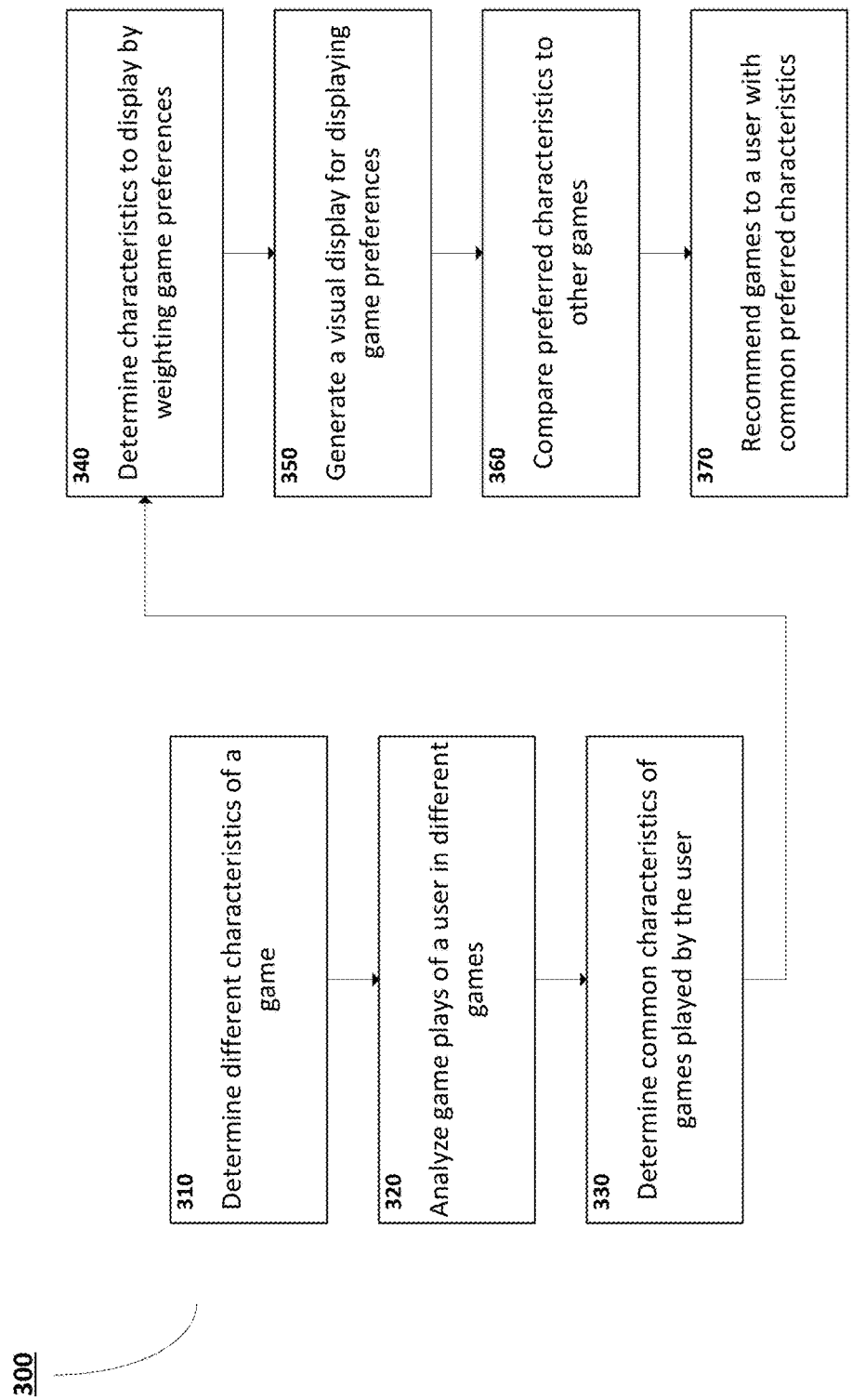
FIG. 3 is a flowchart illustrating an exemplary method for identifying gameplay patterns within different game titles played by the user and making customized predictions as to other game titles.

FIG. 3 is a flowchart illustrating an exemplary method 300 for identifying gameplay patterns within different game titles played by the user and making customized predictions as to other game titles. Method 300 may be executed by a classification server 140 to analyze patterns in game characteristics and user engagement. In step 310, a classification server 140 may receive data from a UDS 200 to determine various game characteristics of one or more games. A UDS 200 may send recorded data regarding interaction of a user with one or more games to a classification server 140 in step 320. A classification server 140 may further analyze interactions of a user with one or more games to determine characteristics of games played by a user. Classification server 140 may determine common characteristics shared between one or more games a user has engaged with in step 330. Further, a classification server 140 may determine common characteristics of games played by a user segmented in one or more genre of games.

In step 340, game characteristics within one or more games or one or more genre of games played by a user from step 330 may be determined as preferred characteristics based on weighted game preferences. Weighted game preferences may be determined by a classification server 140 by detecting repeated patterns in content engaged by a user, prolonged time engaged with content types, and other data reported by a UDS 200 as consistent behavioral traits of a user interaction with one or more games. For example, a user may have engaged with various games in a role-playing game (RPG) in a history of gameplay. Within a majority of RPGs a user has engaged with, in-game combat may be turn-based. Based on a user engaging with several games in an RPG genre, and a majority of those games containing a turn-based combat system, a classification server 140 may determine a preferred characteristic of a user to be turn-based combat.

In step 350, preferred game characteristics common to one or more games provided in step 340 may be determined as important to a user based on previously determined weight and may be generated to a data visualization for display. Further still, a classification server 140 may compare generated game characteristics to one or more games a user has not engaged with and may display a generated comparison in step 360. Finally, a classification server 140 may provide recommendations to a user in step 370 based on a comparison of common generated characteristics. Recommendations may include an overlaid or superimposed data visualization to display common generated characteristics of games in a user gameplay history with other games not yet engaged with by a user.

Figure 4:
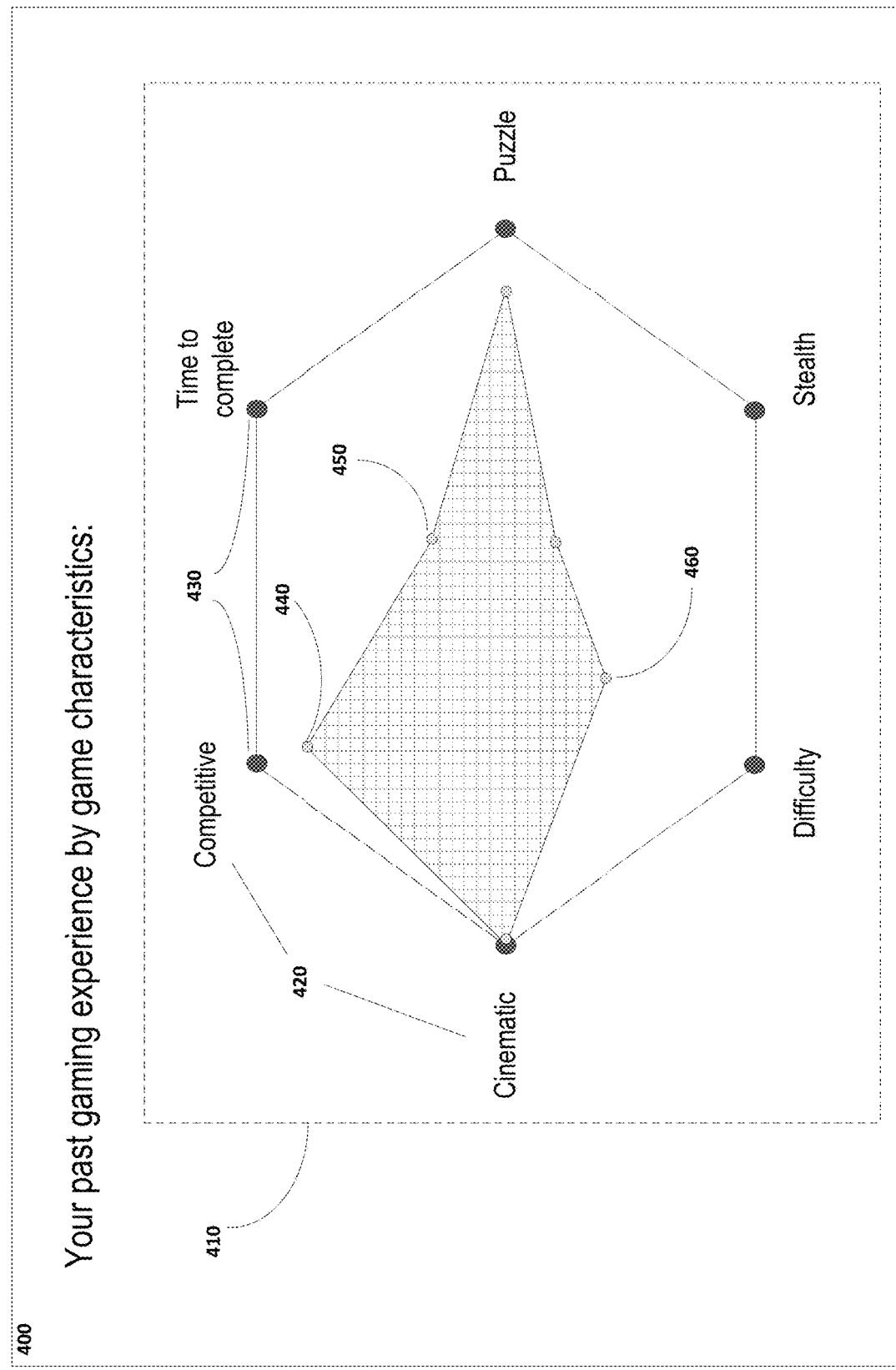
FIG. 4 illustrates an exemplary data visualization of gameplay styles associated with a user.

FIG. 4 illustrates an exemplary data visualization 400 of gameplay styles associated with a user. Once preferred game characteristics of a user has been generated by a classification of game styles server 140, such as described previously in process 300, a data visualization 400 may be presented via a graphical user interface (GUI) on a display of a user device 150. Various types of data visualization displays may be generated to assist in guiding a user to understand a classification of gaming style based on game characteristics.

In one embodiment, the preferred game characteristics of a user are plotted on a hexagonal radar chart 410. Labels for each preferred game characteristic of a user 420 may be displayed adjacent to each vertex. Game characteristics plotted within a hexagonal radar chart 410 may represent a strong presence of a game characteristic within a game the closer a point is plotted in relation to a vertex 430, while a point plotted closer to the center may represent a weak presence of a game characteristic within a game. However, it should be noted that measurements of a game characteristic and a plotted point related to a game characteristic may be representative of various types of information. For example, plotted point 440 may represent a strong presence of competitive characteristics in a game, while plotted point 450 may represent a short time to complete a match or game within a peer-to-peer (P2P) gameplay mode. Further, point 460 may represent a medium level of difficulty as a characteristics of one or more games.

Figure 5:
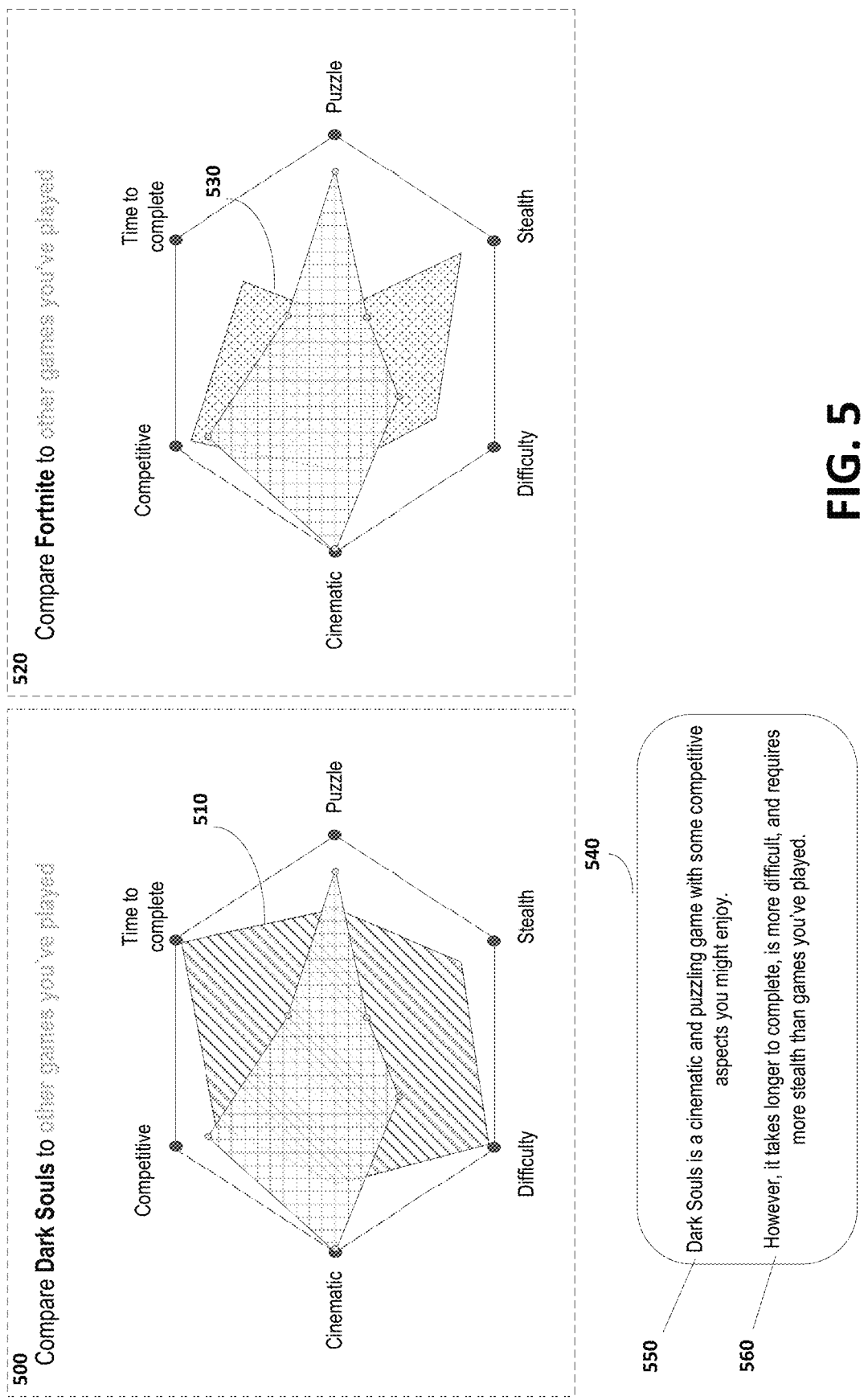
FIG. 5 illustrates exemplary data visualizations of game characteristics of one or more game titles overlaid on the data visualization of FIG. 4.

FIG. 5 illustrates exemplary data visualizations 500 and 520 of game characteristics of one or more game titles overlaid on the data visualization of FIG. 4. A data visualization 400 of preferred game characteristics of a user may be overlaid on, combined with, or otherwise compared to a data visualization of one or more additional games. A method of comparison of game characteristics may be determined based on a selected data visualization generated by a classification server 140.

In one embodiment, a user may view one or more games that they have not played previously, and an overlapping data visualization 500 comparing preferred game characteristics with a selected game may be displayed on a GUI of a user device 150. A user may select to view a game through a variety of methods including but not limited to a digital store catalog, a social connection list, or an in-game menu of a demonstration or trial game. A classification server 140 may combine a user preferred game characteristics visualization 400 with a selected game by displaying a plot of the same game characteristics as a detected set of user preferred game characteristics for a selected game 510. Further, one or more additional games may be selected simultaneously and may display additional data visualization 520 with plotted game characteristics of additionally selected games 530. Similarities and differences of game characteristics of a selected game 510 or 530 and a preferred game characteristic of a user 400 may be visually compared.

Further, a classification server 140 may detect details of a compared data visualization of one or more games and generate a message 540 to display via the GUI of a user device 150. A message 540 may communicate information displayed in a selected data visualization 500 or 520 to a user in order to assist in interpretation of the compared game characteristics of one or more games. For example, information regarding similar data points of characteristics of a selected game compared to a preferred game characteristic of a user may be outlined in a first message 550. Further, differences in characteristics of a selected game compared to a preferred game characteristic of a user may be outlined in a second message 560.

Figure 6:
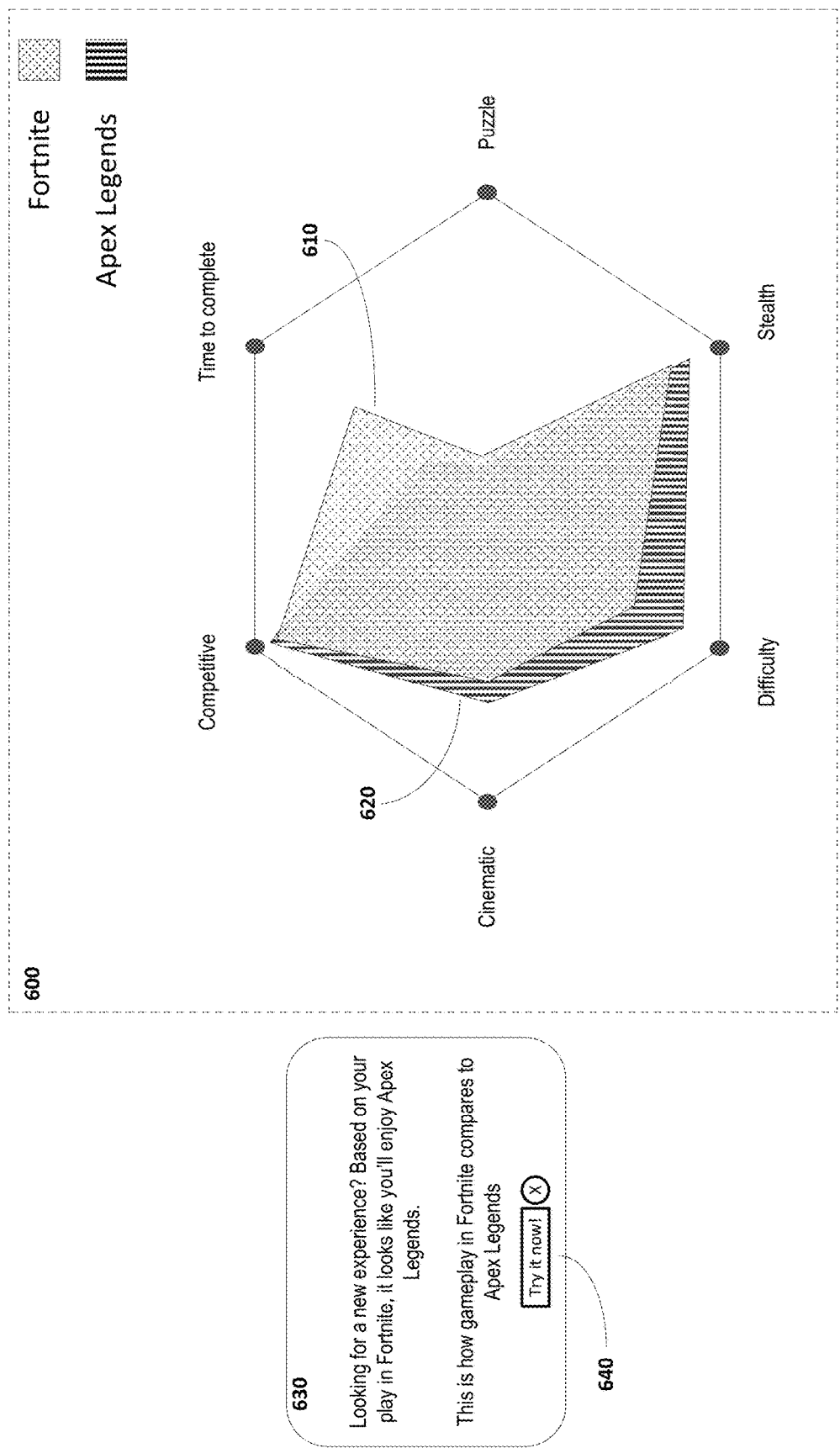
FIG. 6 illustrates an exemplary display for providing a recommendation for a game having gameplay characteristics that overlap with identified gameplay styles of a user.

FIG. 6 illustrates an exemplary display for providing a recommendation for a game having gameplay characteristics that overlap with identified gameplay styles of a user. In addition to comparing a data visualization of preferred game characteristics of a user to one or more other games as in 500 and 520, a classification server 140 may compare game characteristics between one or more games based on preferred game characteristics of a user.

In one embodiment, a classification server 140 may detect a weighted factor with a genre or game for a user based on data received from a UDS 200 such as prolonged overall playtime, and may determine a preferred game characteristics associated with the game or genre described previously in step 340 and 350 of FIG. 3. Utilizing the determined preferred game characteristics of a user, a classification server 140 may further compare one or more games and those games characteristics described in step 360. One or more games possessing characteristics similar to a game or genre of preferred game characteristics may be compared and overlaid on a data visualization 600. A first game a user has engaged with previously 610 may be overlaid or superimposed with a second game 620 a user has not yet engaged with and characteristics related to the first game and the second game as well as related to preferred game characteristics of a user may be displayed in the data visualization 600.

Further, a classification server 140 may display a message 630 to inform the user about the comparison between a first game and a second game in relation to preferred game characteristics. A recommendation may be provided via a message 630 or other on-screen prompt associated with a data visualization of compared games 600. A call to action to engage in a recommendation 640 may be displayed with a button prompt or other user input requested to progress to play a second game provided by a recommendation. A classification server 140 may further process gameplay data received from a UDS 200 related to preferred gameplay style of a user within one or more games.

Figure 7:
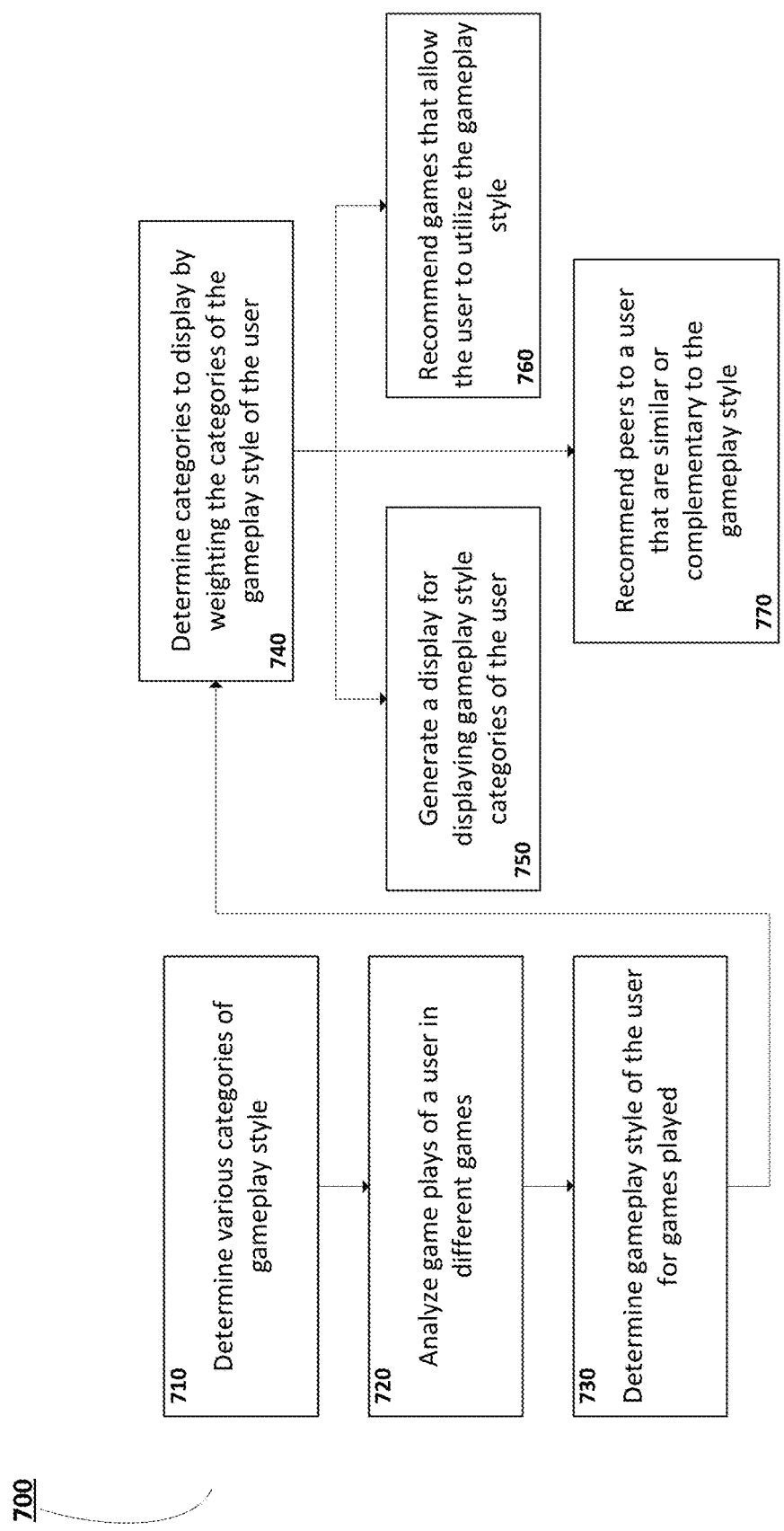
FIG. 7 is a flowchart illustrating an alternative method for identifying gameplay patterns within different game titles played by the user and making customized predictions as to other game titles.

FIG. 7 is a flowchart illustrating an alternative method 700 for identifying gameplay patterns within different game titles played by the user and making customized predictions as to other game titles. Method 700 may be executed by a classification server 140 to determine preferred gameplay styles of a user. A classification server 140 may receive data from a UDS 200 related to gameplay styles in one or more games. Various categories of gameplay style may be determined in step 710 based on data captured by a UDS 200. Interaction with in-game objects, entities, activities, and events provided by a UDS 200 to a classification server 140 may be utilized to analyze preferences of a user gameplay style in one or more games in step 720. Further, in step 730 a classification server 140 may associate preferences from step 720 across one or more games to determine a user preferred gaming style across games played. Preferred gaming style may be further analyzed to determine preferences of a user in one or more genre of games. In step 740, a classification server 140 may determine preferred gaming style categories of a user across games and genres analyzed in step 730 by assigning a weight for preferred gaming styles. Preferred gaming style weights may be determined by consistent preferences detected across gameplay of one or more games of a user. For example, a user engaging in similar activities in a game repeatedly or across multiple games may be analyzed to be a weighted preference of user gaming style. Further, as more data is collected by a UDS 200, and a user continues to engage in similar activities, a related weighted preference for an activity may be determined as important to a user and will increase in importance the more frequently and consistently a user engages in an activity or behavior.

In an exemplary embodiment, a user may engage with more than one single player game. Each single player game engaged by a user may contain mandatory activities a player must complete to progress in a game, as well as voluntary activities a player may complete for additional in game bonuses, content, or character progression. Across the history of playtime of a user, a UDS 200 may capture and report engagement with mandatory and voluntary activities to a classification server 140. A user may choose to complete voluntary activities in addition to mandatory activities in one or more single player games. A user may also complete each mandatory activity of one or more games, and subsequently "finish" one or more games mandatory content of a game required for completion. A classification server 140 may determine a weighted consistent playstyle of a user to be a "completionist" or a user who prefers to complete both mandatory and voluntary activities to engage in a majority of content that may be available in a game's defined activities.

Preferred gaming styles of a user determined in step 740 may be utilized by a classification server 140 to provide additional content, recommendations and present a user with information on their preferred gaming styles. Exemplary embodiments and the use of preferred gaming style categories follow in steps 750, 760, and 770, and are further detailed in FIG. 8 and FIG. 9.

In one embodiment, a classification server 140 may display preferred gaming style categories of a user to a data visualization as in step 750. A display of preferred gaming style categories may be displayed to a user via a GUI of a user device 150. For example, a display may be displayed to illustrate a user game style preference for combat types, activity paths, and character growth in an Action RPG.

Figure 8:
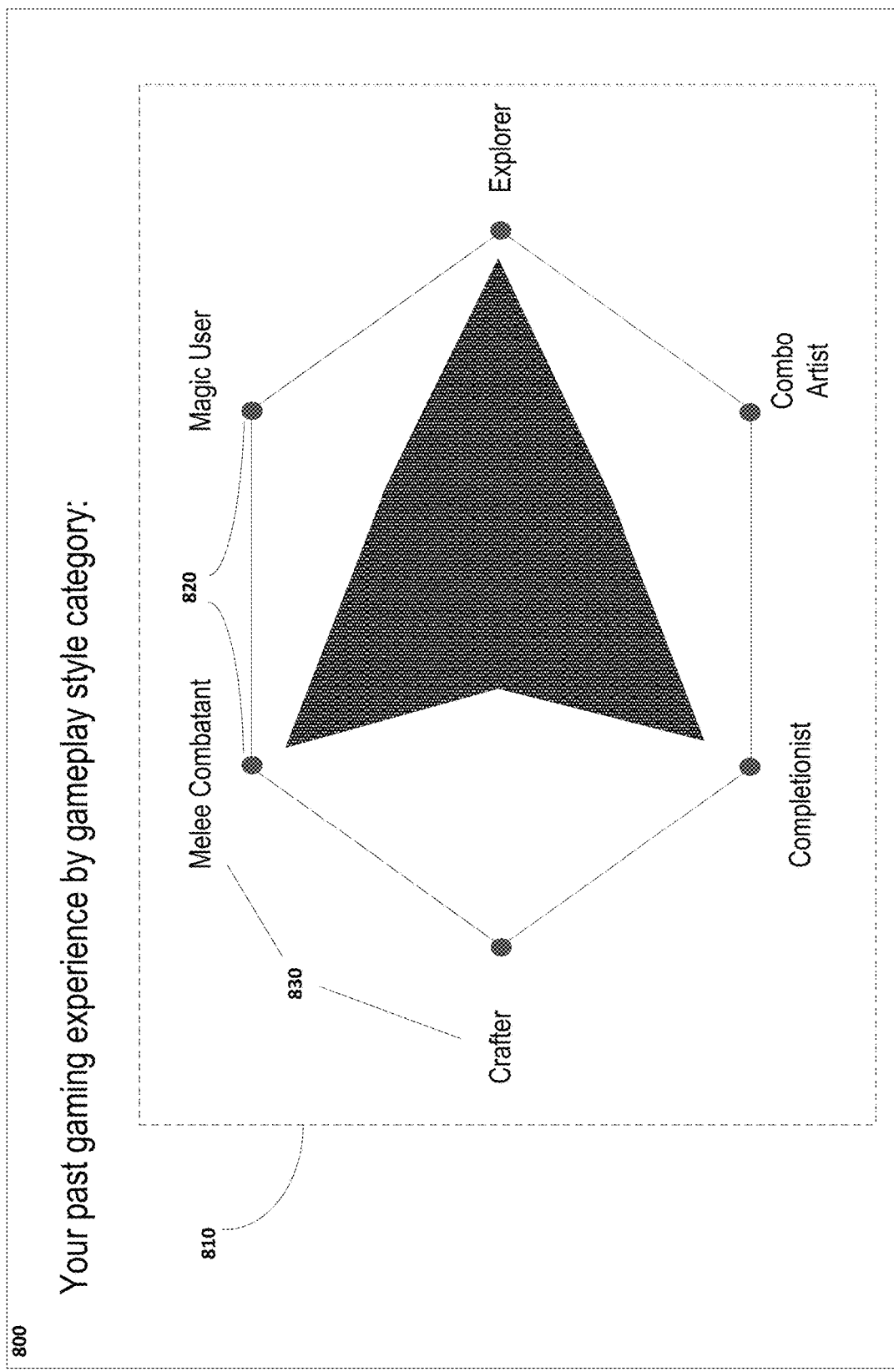
FIG. 8 illustrates an exemplary data visualization of gameplay styles associated with a user.

FIG. 8 illustrates an exemplary data visualization 800 of gameplay styles associated with a user. Preferred gaming style of a user may be displayed as a data visualization 800. The preferred gaming style categories of a user may be plotted on a hexagonal radar chart 810. Labels for each preferred gaming style category 830 may be displayed adjacent to each vertex 820. Preferred game styles plotted within a hexagonal radar chart 810 may represent a strong preference for a user to execute actions related to a game style within a game the closer a point is plotted in relation to a vertex 820, while a point plotted closer to the center of the diagram may represent a weak preference for a game style within a game.

Figure 9:
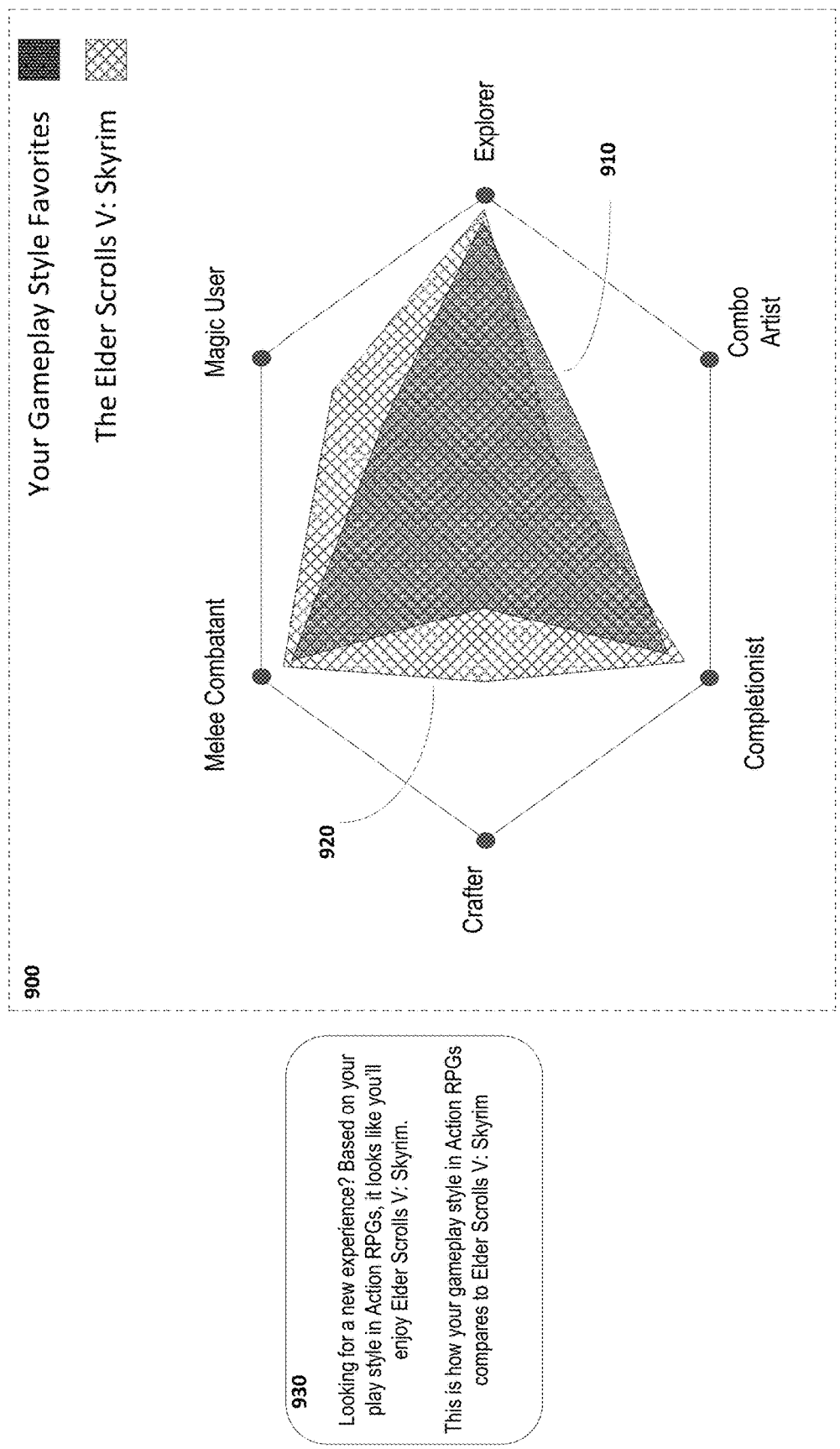
FIG. 9 illustrates an exemplary display for providing a recommendation for a game having gameplay characteristics that overlap with identified gameplay styles of a user.

FIG. 9 illustrates an exemplary display 900 for providing a recommendation 930 for a game having gameplay characteristics that overlap with identified gameplay styles of a user. A display of preferred gaming style of a user as generated in FIG. 8 may be compared to one or more games by a classification server 140. A data visualization 900 may be generated to compare and recommend one or more games similar to a preferred gaming style of a user. A display of preferred gaming style categories of a user 910 may be overlaid or superimposed on a display of gaming styles in one or more games 920. The data visualization 900 may be displayed to a user via a GUI of a user device 150 by a classification server 140. A classification server 140 may provide a recommendation to a user related to a game with similar available gameplay to a preferred game style category of a user. One or more games may be selected for comparison by a classification server 140. Games selected for comparison to a first game played by a user may be displayed to highlight that a user may utilize their preferred game style categories in a second game. A message 930 may be displayed with the data visualization to inform the user of games with similar game style categories and guide them to access the content.

In another embodiment, a classification server 140 may provide recommendations to a user related to social connections within one or more games. A preferred gaming style of a user may be determined in step 770 of FIG. 7 to possess preferences for a type of game or gameplay which may compliment or supplement other similar users. A list of similar and complimentary users may be displayed by a classification server 140 to a user via a GUI of a user device 150. Social contacts may be recommended via such a list for matchmaking in one or more games that may be beneficial to a user and allow them to utilize their preferred game style with other users.

Figure 10:
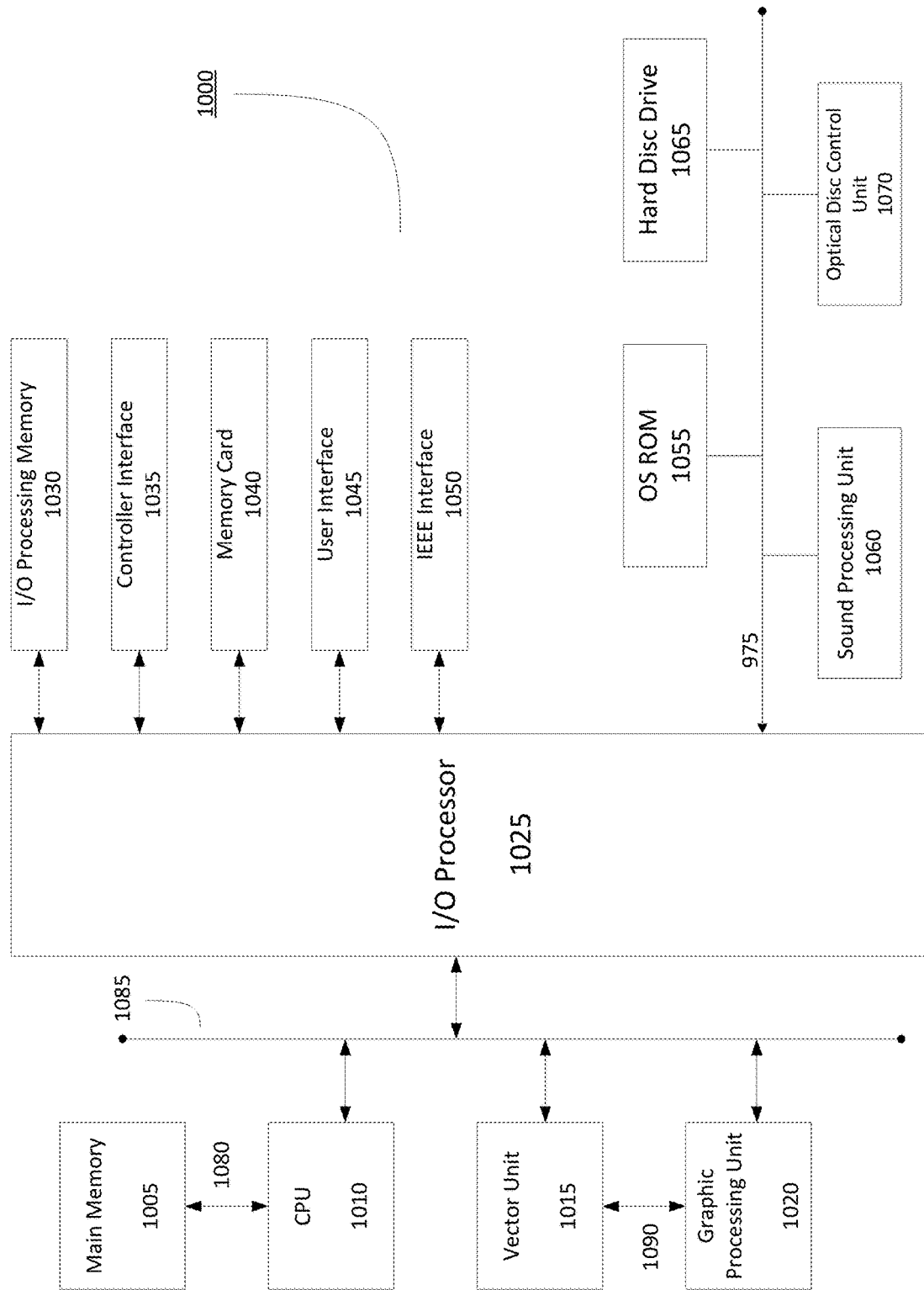
FIG. 10 is a block diagram of an exemplary electronic entertainment system that may be used to implement systems and methods of identifying gameplay patterns within different game titles played by the user and making customized predictions as to other game titles.

FIG. 10 is a block diagram of an exemplary electronic entertainment system 1000 that may be used to implement systems and methods of identifying gameplay patterns within different game titles played by the user and making customized predictions as to other game titles. The entertainment system 1000 of FIG. 10 includes a main memory 1005, a central processing unit (CPU) 1010, vector unit 1015, a graphics processing unit 1020, an input/output (I/O) processor 1025, an I/O processor memory 1030, a controller interface 1035, a memory card 1040, a Universal Serial Bus (USB) interface 1045, and an IEEE interface 1050. The entertainment system 1000 further includes an operating system read-only memory (OS ROM) 1055, a sound processing unit 1060, an optical disc control unit 1070, and a hard disc drive 1065, which are connected via a bus 1075 to the I/O processor 1025.

Entertainment system 1000 may be an electronic game console. Alternatively, the entertainment system 1000 may be implemented as a general-purpose computer, a set-top box, a hand-held game device, a tablet computing device, or a mobile computing device or phone. Entertainment systems may contain more or less operating components depending on a particular form factor, purpose, or design.

The CPU 1010, the vector unit 1015, the graphics processing unit 1020, and the I/O processor 1025 of FIG. 10 communicate via a system bus 1085. Further, the CPU 1010 of FIG. 6 communicates with the main memory 1005 via a dedicated bus 1080, while the vector unit 1015 and the graphics processing unit 1020 may communicate through a dedicated bus 1090. The CPU 1010 of FIG. 10 executes programs stored in the OS ROM 1055 and the main memory 1005. The main memory 1005 of FIG. 10 may contain pre-stored programs and programs transferred through the I/O Processor 1025 from a CD-ROM, DVD-ROM, or other optical disc (not shown) using the optical disc control unit 1070. I/O Processor 1025 of FIG. 10 may also allow for the introduction of content transferred over a wireless or other communications network (e.g., 4G, LTE, 3G, and so forth). The I/O processor 1025 of FIG. 10 primarily controls data exchanges between the various devices of the entertainment system 1000 including the CPU 1010, the vector unit 1015, the graphics processing unit 1020, and the controller interface 1035.

The graphics processing unit 1020 of FIG. 10 executes graphics instructions received from the CPU 1010 and the vector unit 1015 to produce images for display on a display device (not shown). For example, the vector unit 1015 of FIG. 10 may transform objects from three-dimensional coordinates to two-dimensional coordinates, and send the two-dimensional coordinates to the graphics processing unit 1020. Furthermore, the sound processing unit 1060 executes instructions to produce sound signals that are outputted to an audio device such as speakers (not shown). Other devices may be connected to the entertainment system 1000 via the USB interface 1045, and the IEEE interface 1050 such as wireless transceivers, which may also be embedded in the system 1000 or as a part of some other component such as a processor.

A user of the entertainment system 1000 of FIG. 10 provides instructions via the controller interface 1035 to the CPU 1010. For example, the user may instruct the CPU 1010 to store certain game information on the memory card 1040 or other non-transitory computer-readable storage media or instruct a character in a game to perform some specified action.

The system may be implemented in an application that may be operable by a variety of end user devices. For example, an end user device may be a personal computer, a home entertainment system (e.g., Sony PlayStation2® or Sony PlayStation3® or Sony PlayStation4®, or Sony PlayStation5®), a portable gaming device (e.g., Sony PSP® or Sony Vita®), or a home entertainment system of a different albeit inferior manufacturer. The present methodologies described herein are fully intended to be operable on a variety of devices. The system may also be implemented with cross-title neutrality wherein an embodiment of the present system may be utilized across a variety of titles from various publishers.

The present system may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of generating custom predictions of in-game behavior, the method comprising:
retrieving gameplay data associated with a plurality of gameplay sessions in which a plurality of different users played one or more of a plurality of different game titles;

analyzing the gameplay data to identify a pattern of in-game behavior, wherein the pattern associates a category of in-game behavior with one or more in-game parameters in common across a set of gameplay sessions of the plurality of gameplay sessions;

generating a weighted pattern by assigning a weight to the pattern based on detected repetition of the pattern and consistency of the in-game behavior across the set of gameplay sessions; and generating a custom prediction regarding a user based on a comparison of the weighted pattern to a profile of the user, wherein the custom prediction corresponds to one or more gameplay recommendations.

2. The method of claim 1, wherein the in-game parameters correspond to a content type associated with the set of gameplay sessions.

3. The method of claim 1, wherein the in-game parameters correspond to a type of in-game challenge associated with the set of gameplay sessions.

4. The method of claim 1, wherein the in-game parameters correspond to a type of in-game object associated with the set of gameplay sessions.

5. The method of claim 1, wherein the in-game parameters correspond to a metric measuring an in-game status associated with the set of gameplay sessions.

6. The method of claim 1, wherein assigning the weight to the pattern is further based on an amount of time spent engaging with one or more game titles of the plurality of different game titles associated with one or more of the in-game parameters.

7. The method of claim 1, further comprising generating a visual display that includes a data visualization of the weighted pattern.

8. The method of claim 7, further comprising updating the visual display to superimpose a graphical representation of one or more characteristics of at least one game title on the data visualization.

9. The method of claim 1, wherein the gameplay recommendations include one or more game titles of the plurality of different game titles that include one or more of the in-game parameters in common across the set of gameplay sessions.

10. The method of claim 1, further comprising generating the gameplay recommendations based on a match between the weighted pattern and the profile of the user.

11. The method of claim 1, further comprising identifying complementary users of the plurality of different users based on an identified pattern of in-game behavior associated with the complementary users, wherein the one or more gameplay recommendations include one or more complementary users.

12. The method of claim 11, wherein identifying the complementary users includes comparing the identified pattern associated with the complementary users with the weighted pattern of the user.

13. A system for generating custom predictions of in-game behavior, the system comprising:
a memory; and
a processor that executes instructions stored in the memory, wherein execution of the instructions by the processor:
retrieves gameplay data associated with a plurality of gameplay sessions in which a plurality of different users played one or more of a plurality of different game titles;

analyzes the gameplay data to identify a pattern of in-game behavior, wherein the pattern associates a category of in-game behavior with one or more in-game parameters in common across a set of gameplay sessions of the plurality of gameplay sessions;

generate a weighted pattern by assigning a weight to the pattern based on detected repetition of the pattern and consistency of the in-game behavior across the set of gameplay sessions; and generates a custom prediction regarding a user based on a comparison of the weighted pattern to a profile of the user, wherein the custom prediction corresponds to one or more gameplay recommendations.

14. The system of claim 13, wherein the weight to the pattern is further assigned based on an amount of time spent engaged with one or more game titles associated with one or more in-game parameters.

15. The system of claim 13, wherein the processor executes further instructions to generate a visual display that includes a data visualization of the weighted pattern.

16. The system of claim 15, wherein the processor executes further instructions to update the visual display to superimpose a graphical representation of one or more characteristics of at least one game title on the data visualization.

17. The system of claim 13, wherein the one or more gameplay recommendations include one or more game titles of the plurality of different game titles that include one or more of the in-game parameters in common across the set of gameplay sessions.

18. The system of claim 13, wherein the processor executes further instructions to identify one or more complementary users of the plurality of different users based on an identified pattern of in-game behavior associated with the complementary users, wherein the one or more gameplay recommendations include the complementary users.

19. The system of claim 18, the complementary users are identified by comparing the identified pattern of in-game behavior associated with the complementary users with the weighted pattern of the user.

20. A non-transitory computer-readable storage medium, having embodied thereon a program executable by a processor to perform a method of generating custom predictions of in-game behavior, the method comprising:
retrieving gameplay data associated with a plurality of gameplay sessions in which a plurality of different users played one or more of a plurality of different game titles;

analyzing the gameplay data to identify a pattern of in-game behavior, wherein the pattern associates a category of in-game behavior with one or more in-game parameters in common across a set of gameplay sessions of the plurality of gameplay sessions;

generating a weighted pattern by assigning a weight to the pattern based on detected repetition of the pattern and consistency of the in-game behavior across the set of gameplay sessions; and generating a custom prediction regarding a user based on a comparison of the weighted pattern to a profile of the user, wherein the custom prediction corresponds to one or more gameplay recommendations.

* * * * *